United States Patent

Mathis

[15] 3,650,830
[45] Mar. 21, 1972

[54] RECOVERY SYSTEM

[72] Inventor: Edmund A. Mathis, Staten Island, N.Y.

[73] Assignee: Nichols Engineering & Research, New York, N.Y.

[22] Filed: June 30, 1969

[21] Appl. No.: 851,121

Related U.S. Application Data

[62] Division of Ser. No. 563,240, July 6, 1966, abandoned.

[52] U.S. Cl. .................................. 134/19, 75/44 S, 75/63, 75/68, 134/25, 201/25, 201/27
[51] Int. Cl. ...................................... C22b 21/00, B08b 7/00
[58] Field of Search .................. 134/2, 5, 19, 38, 25; 29/403; 75/44 S, 63, 68; 266/20; 201/25, 27

[56] References Cited

UNITED STATES PATENTS

| | | | |
|---|---|---|---|
| 3,484,231 | 12/1969 | Uzdavines | 75/43 |
| 1,526,400 | 2/1925 | Waldmann | 75/44 S UX |
| 1,629,563 | 5/1927 | Westburg | 75/44 S UX |
| 2,288,980 | 7/1942 | Turin | 134/41 UX |
| 2,302,980 | 11/1942 | Stern | 29/403 UX |
| 2,333,111 | 11/1943 | Lykken | 266/20 UX |
| 2,709,666 | 5/1955 | Speekman | 134/38 X |
| 2,977,255 | 3/1961 | Lowry | 134/38 X |
| 3,175,809 | 3/1965 | Grimes | 266/20 X |
| 3,207,201 | 9/1965 | Zink et al. | 23/277 C X |
| 3,225,428 | 12/1965 | Deitz | 29/403 UX |
| 3,346,417 | 10/1967 | Ehrlich | 134/25 X |

Primary Examiner—Morris O. Wolk
Assistant Examiner—D. G. Millman
Attorney—John T. Cella, Charles B. Cannon, Lawrence F. Scinto, Carrol G. Harper, Charles W. Bradley, Edward T. Grimes, William J. Brunet, Robert L. Baechtold and Joseph M. Fitzpatrick

[57] ABSTRACT

Aluminum is recovered from scrap by volatilization of organics from the scrap in a non-oxidizing furnace having multiple hearths, and thereafter separating the aluminum from the ash by mechanical means.

3 Claims, 5 Drawing Figures

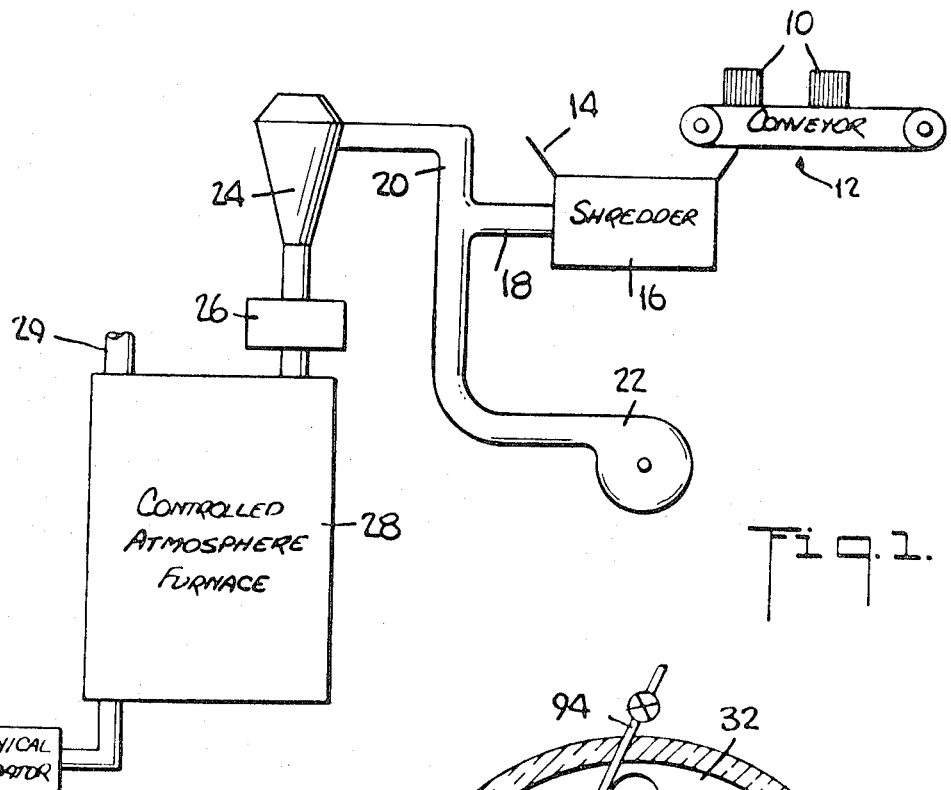
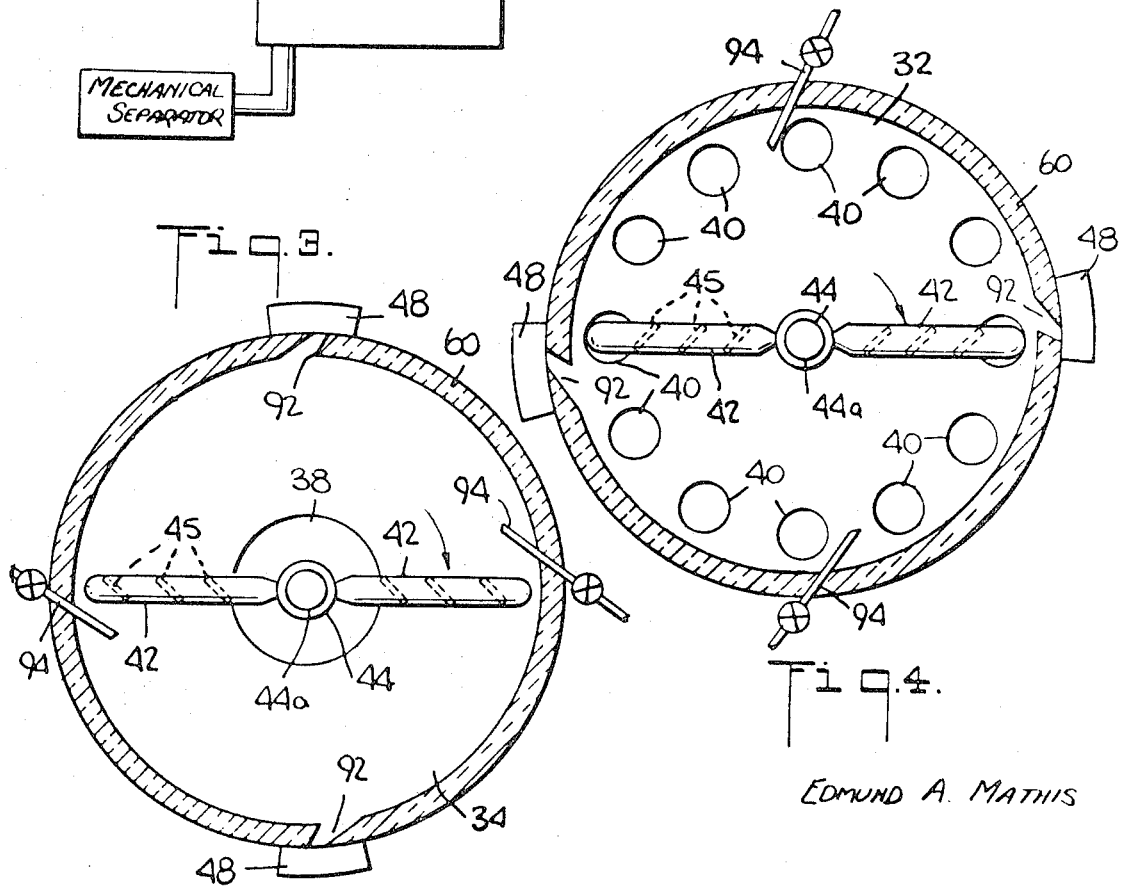
Fig. 1.
Fig. 3.
Fig. 4.
EDMUND A. MATHIS

EDMUND A. MATHIS

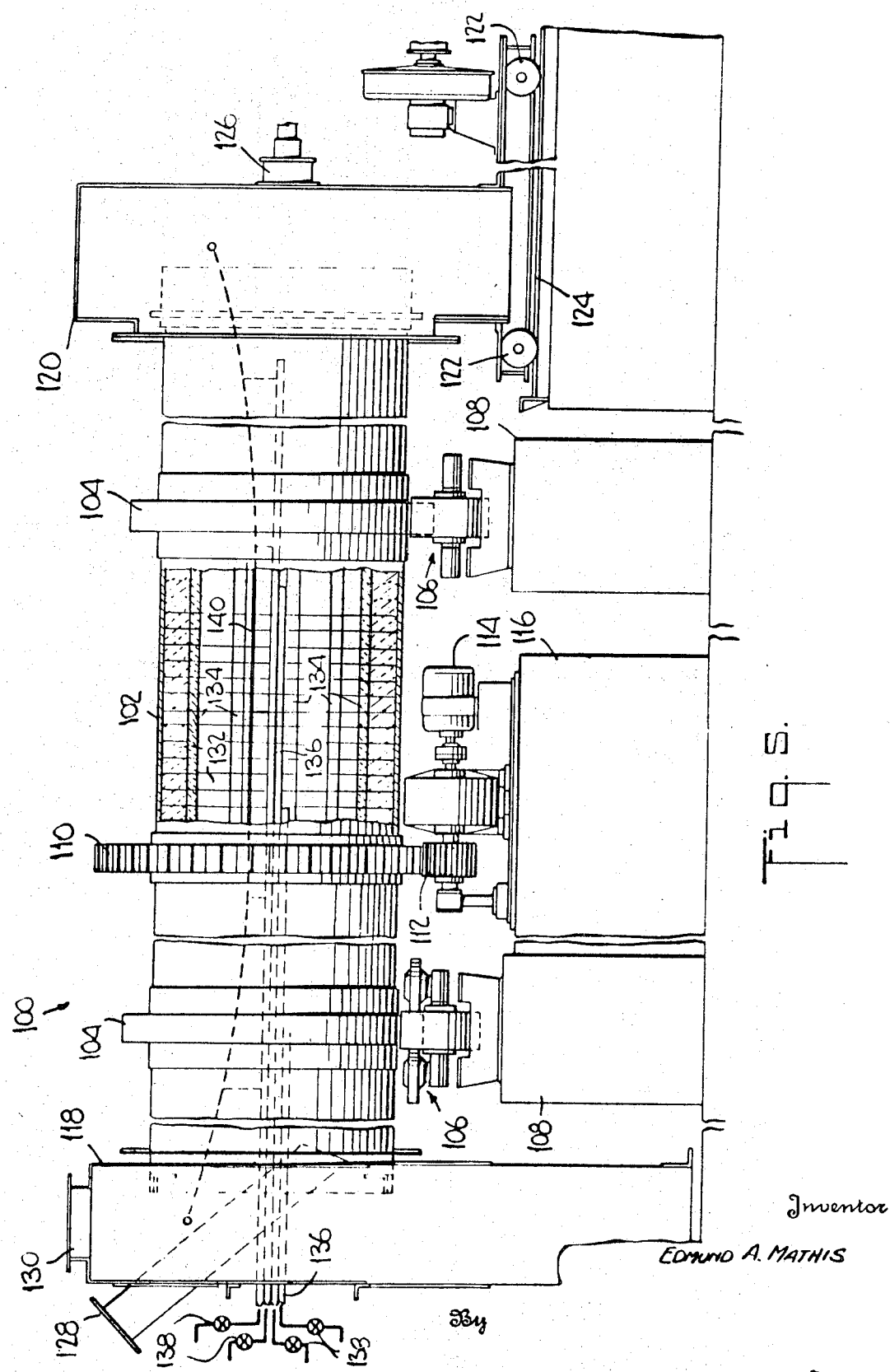

RECOVERY SYSTEM

This application is a division of copending application, Ser. No. 563,240, filed July 6, 1966, now abandoned.

This invention relates to the recovery of metallic values and more particularly it concerns the separation of scrap metals from adherent organic material.

The present invention is particularly suited to the recovery of aluminum from aluminum scrap. A considerable amount of such scrap is generated at plants where printing is done on aluminum foil. The foil is usually laminated with an organic backing material such as wax, plastic, lacquer, paper or paperboard. The metallic aluminum may constitute anywhere from 7 percent to 55 percent of the total weight of the scrap.

Scrap aluminum is generally collected and baled for storage or for shipment. It is processed according to prior art techniques by breaking open the bales and shredding the material, and thereafter blowing the shredded material through a continuous combustion unit. The material becomes ignited in the combustion unit and then passes into one end of an elongated combustion trough. The bottom of the trough is made of a flat steel plate on which rides a drag chain conveyor with steel flights, so as to move the burning scrap continuously through the trough. An insulated hood having several smoke stacks is positioned over the trough and combustion air is admitted into the trough just under the hood. At the other end of the trough the burned material is milled or hammered and subjected to mechanical separation. The aluminum portion is then passed through a rotary kiln at about 950° F. where the carbon is mostly burned off.

The continuous combustion technique described above is subject to several serious defects. The most serious of these defects involves the occurrence of thermite type reactions whereby some of the aluminum reacts very violently with oxygen to produce temperatures in the region of 2,300° F. These high temperatures melt the surrounding aluminum and cause it to adhere to and clog the interior of the trough. The high temperatures also have a destructive effect on the insulation material which is used to line the trough. As a result, the operation of the system is intermittent rather than continuous. Also, the system becomes very expensive to operate and maintain.

An additional difficulty associated with the continuous combustion trough is that it produces an exorbitant amount of heavy black smoke which presents a nuisance. This smoke has been measured consistently at No. 4 on the Ringleman scale, and very rarely at No. 3. The Ringleman scale extends from No. 0 to No. 5, where No. 5 is smoke of maximum blackness and maximum density.

The present invention overcomes the above-described problems of the continuous combustion system for removal of organic materials from aluminum scrap. With the present invention aluminum scrap may be continually processed in relatively compact and inexpensive equipment. Further, the aluminum values are recovered at a high degree or purity, and no danger of thermite type reaction is presented. The equipment is never subject to temperatures higher than about 1,100° F so that melting does not occur; nor is there any destructive effect produced on the insulative materials in the equipment.

In general the present invention achieves its superior results by heating the dispersed aluminum scrap in a nonoxidizing (e.g., carbonaceous) atmosphere up to a temperature (e.g., 700° F. to 1,100° F.) sufficient to evaporate or to drive off the volatile components of the backing material. This leaves a product comprising aluminum, carbon and ash, from which the aluminum may be readily separated by mechanical means.

As will be described more fully hereinafter aluminum foil scrap which is shredded and dispersed, is processed, according to one example, in a multiple hearth furnace in which there is maintained a nonoxidizing atmosphere. The scrap material is moved through the furnace along each of its hearths in succession. This movement of scrap is accomplished by means of rabble arms which rotate over each hearth. The rabble arms are provided with canted rabble teeth which plow through the scrap material; and by virtue of the cant angle of each set of teeth, they urge the material in a radially inward or outward direction along the associated hearth toward drop holes through which the material eventually passes to the next lower hearth. During its passage through the furnace, the scrap material is relieved of its volatile components which proceed to the top of the furnace and are subjected to controlled burning to supplement the heat input. The output of the furnace is in the form of metallic aluminum, carbon and ash. The carbon and ash, now relieved of the volatile components which bound them to the aluminum are then easily separated from the aluminum by mechanical means.

According to another example of the invention the scrap material is processed in a rotary kiln which is tilted slightly from the horizontal along its longitudinal axis. The material is fed into the upper end of the kiln and it proceeds toward the lower end by virtue of the rotary movement of the kiln. Internal circumferential rings are provided in the kiln at axially displaced locations; and these serve to produce a tumbling or mixing action of the shredded scrap material so that a thorough and even processing is achieved.

According to a further feature of the invention the volatilized organic components which have been released from the scrap material are burned at a distance from the material and the heat generated by such burning is utilized to induce further volatilization of organic material. This burning is achieved without production of thermite type reactions by the introduction of controlled amounts of atmospheric air at locations displaced from the unvaporized metallic residue.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

Specific embodiments of the invention have been chosen for purposes of illustration and description, and are shown in the accompanying drawings, forming a part of the specification, wherein:

FIG. 1 is a schematic representation of an aluminum scrap recovery system employing the principles of the present invention;

FIG. 3 is a section view taken along line 3—3 of FIG. 2; and

FIG. 4 is a section view taken along line 4—4 of FIG. 2; and

FIG. 5 is a side elevational view, partly in section of a kiln arrangement forming an alternate portion of the system of FIG. 1.

Figure 2:
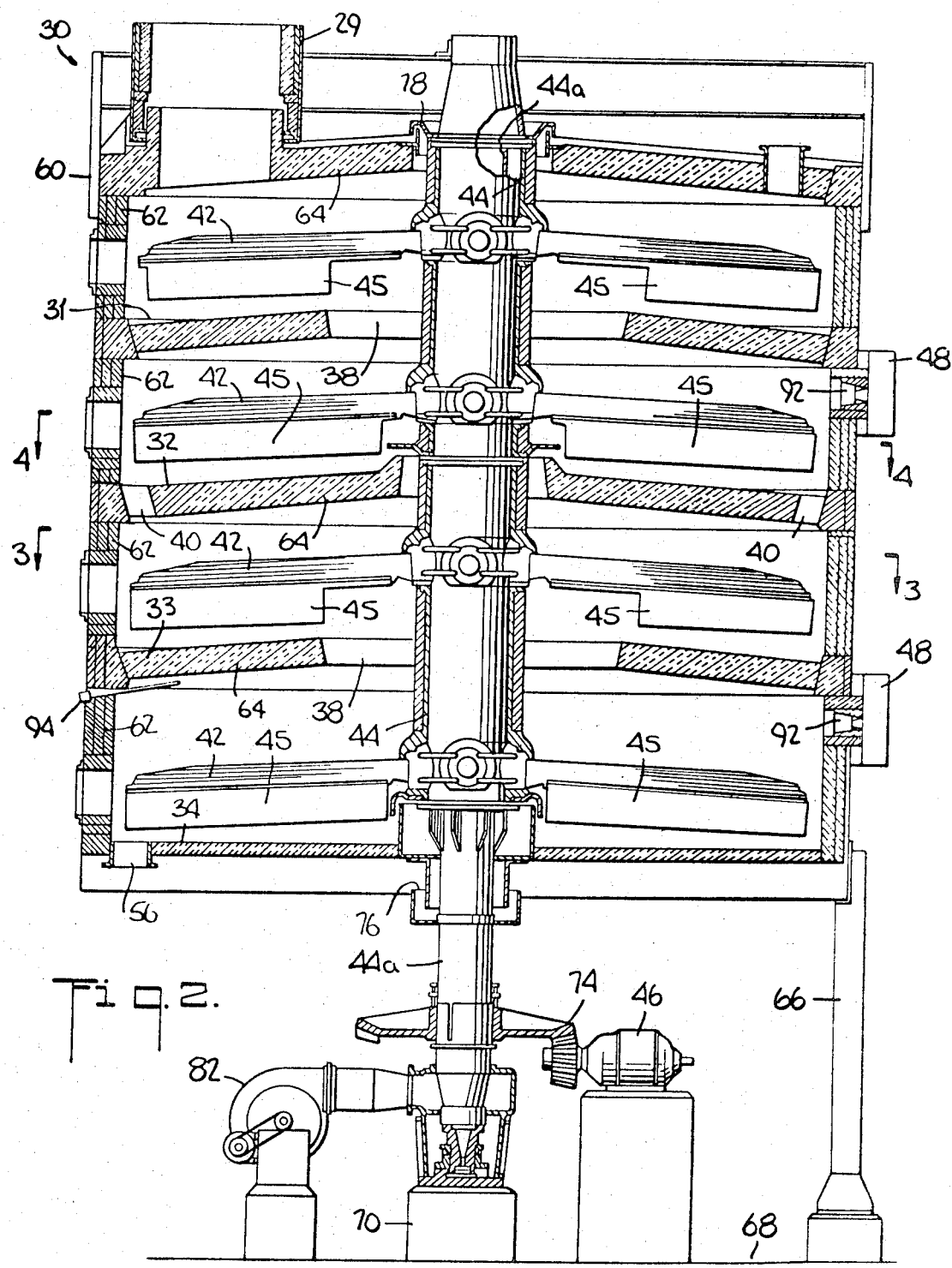
FIG. 2 is a section view, taken in side elevation, of a multiple hearth furnace forming a portion of the system of FIG. 1.

In the system of FIG. 1, bales 10 of aluminum scrap are moved along a belt conveyor 12 and are dropped into a hopper 14 of a shredding machine 16. The shredding machine separates the baled material into individual fragments which then pass out through a conveyor tube 18. The conveyor tube 18 opens into an air conveyor 20 which is powered by a blower 22. The blower serves to convey the shredded aluminum scrap to a cyclone 24 where the scrap fragments are separated from the air stream. The scrap passes downwardly from the cyclone 24 and through an air tight lock 26 into a controlled atmosphere furnace 28.

The interior of the furnace 28 is maintained at a temperature above 700° F., and preferably between 900° F. and 1,100° F. Also the composition of the furnace atmosphere is kept under close control so that no oxygen will come into contact with the metallic aluminum in the scrap material. As a result of this, the volatile organic materials forming the major portion of the non-aluminum values are vaporized and separate from the solid scrap. These materials are then discharged, or as will be described, are burned and their products of combustion are discharged out through a stack 29. The remainder of the scrap material, i.e., the solid residue composed chiefly of metallic aluminum values and solid, loosely adherent, carbon and ash are passed through a mechanical separator 30 where these materials are crushed and separated to provide high grade aluminum.

As indicated above, the furnace 28 may be of the multiple hearth variety. One such furnace is illustrated in FIGS. 2–4. As shown in FIG. 2, there is provided a multiple hearth type controlled atmosphere furnace 30, containing four hearths 31, 32, 33 and 34, arranged in stacked array. The first and third hearths 31 and 33 have drop openings 38 near their center for allowing material to pass down to the next lower hearth. Similarly, the second and fourth hearths 32 and 34 have drop openings 40 near their peripheries to allow material to pass down through to the next lower hearth. Thus material can pass down through the furnace 30 by moving back and forth in inward and outward radial directions over the various hearths towards their respective drop openings. In order to effect this back and forth movement there are provided rabble arms 42 attached to a common vertical shaft 44 and extending out over each hearth. The shaft 44 and arms 42 are rotated by means of a motor 46 connected to the shaft under the furnace. As the rabble arms rotate, various rabble teeth 45 which hang down from each arm scrape through the material on the hearth and, by virtue of the angular orientation of the blades, they urge the material toward the hearth openings.

Various burners 48 are provided in association with the furnace 30; and these burners exhaust into the regions immediately above each hearth. As will be explained more fully hereinbelow, these burners are specially controlled so that the products of combustion which they discharge into the furnace serve to maintain a carbonaceous reducing atmosphere within the furnace, at least in the vicinity of the aluminum values. Also, the pressure within the furnace 30 is maintained slightly above atmospheric to ensure that no atmospheric oxygen will be drawn into it.

As the aluminum scrap passes through the furnace 30, the high temperatures within the furnace produced by the burners 48 serve to volatilize the major portion of the organic material associated with the aluminum values. This material disassociates from the scrap and passes upwardly from the hearth. By feeding controlled amounts of supplemental air into the furnace above the various hearths, the volatilized organic material can be burned away from the aluminum. This avoids thermite incidences and at the same time, it reduces the amount of heat which must be supplied by the burners 48. The supplemental air is supplied via inlet conduits 50 and is controlled by means of valves 52 interposed along each conduit.

Considering now the specific structural configuration of the furnace 30, it will be seen that the furnace is made up of a steel shell 60 of generally tubular configuration and extending vertically upward. The inside of the shell 60 is lined with refractory brick as indicated at 62. Also, the various hearths within the furnace are made up of refractory brick as indicated at 64. These hearths are of slightly arched configuration, for purposes of strength and load carrying ability. The furnace 30 is supported on columns 66 above a floor or base 68 in order to provide room for the various structures which operate underneath the furnace.

As shown, the common vertical shaft 44 extends through the length of the furnace 30 and down through its bottom to a bearing and support pedestal 70 which rests on the base 68. The motor 46 rests on another pedestal 72 and drives through a pinion and gear arrangement 74 to turn the shaft 44. A sand seal 76 is provided at the bottom of the furnace in order to permit the shaft 44 to rotate while preventing gas leaks through the bottom of the furnace. Another seal 78 is provided at the top of the furnace for similar reasons.

The various rabble arms 42, as shown in FIG. 2, extend radially outward from the shaft 44 and into each of the hearths 31, 32, 33 and 34. The rabble teeth 45 hang down from the arms 42 to a level just above the hearth floor. As shown in FIGS. 3 and 4, the teeth 45 are canted so that as they rotate they will induce radial movement toward the openings 38 or 40 of their respective hearth floor.

Certain critical portions of the furnace 30 are cooled by means of a well known air flow system. As partially shown in FIG. 2, the common vertical shaft 44 is hollow; and is provided with a concentric internal tube 44a. The rabble arms 42 extend through the shaft and into the tube. Cooling air is blown up through the tube 44a from a blower under the furnace and passes out along one passage in each rabble arm and back through an adjacent passage to the space between the tube 44a and the shaft 44 from where it is exhausted. This cooling air thus serves to prevent excessive heating of both the rabble arms and the rabble teeth. At the same time the cooling air is kept isolated from the atmosphere within the furnace itself.

The top of the furnace 30 including the exhaust stack 29, is lined with refractory brick as indicated at 64.

As illustrated typically at 92, there are provided various burner inlet openings through the outer furnace wall. These inlet openings communicate with the burners 48 and they are arranged within each hearth region to permit control of both the temperature and atmospheric conditions within each hearth region.

Also, as illustrated typically at 94, there are provided various inlet openings into which supplemental air may be introduced into each of the hearths.

During operation of the system the burners and supplemental air inlets are controlled to maintain the top hearth 31 at a temperature of from 900° F. to 1,100° F. The second and third hearths 32 and 33 are maintained at 900° F. to 1,000° F., while the lower hearth is maintained at about 700° F. As the scrap is rabbled across the various hearths by the rabble teeth 45 in the presence of the high temperature nonoxidizing atmosphere within the furnace, the organic material in the scrap volatilizes and carbonizes. The final furnace product consists of about 90 percent aluminum and 10 percent carbon and ash which permits effectively complete recovery of the aluminum values in the scrap.

The use of the technique of controlled atmosphere heating to volatize and separate certain organic portions of aluminum scrap, permits of a far smaller processing enclosure than would be required for the conventional open combustion technique. Thus whereas an 8,000 pound per hour scrap feed rate would require a hearth area of from 4,000 to 5,000 square feet, the technique of the present invention makes it possible to process scrap at 8,000 pounds per hour with a hearth area of less than 1,100 square feet.

FIG. 5 shows an alternate controlled atmosphere furnace 100 of the kiln type. The furnace 100 comprises an elongated tubular shell 102 of steel or similar material positioned with its longitudinal axis tilted very slightly from the horizontal.

The shell 102 is provided with external bearing rings 104 which rest on roller bearings 106; and these roller bearings in turn are mounted for free rotation on support pedestals 108. There is also provided an external ring gear 110 which surrounds the shell 102. A pinion gear 112 drivably engages the ring gear 110 for rotating the shell 102 about its longitudinal axis. The pinion gear 112 is driven from a motor 114 and both the gear 112 and the motor 114 are mounted on a common support pedestal 116.

The kiln type furnace 100 is closed at each end by non rotatable front and rear head assemblies 118 and 120. The front head assembly 118 is stationarily mounted while the rear head assembly 120 is arranged with rollers 122 which ride on rails 124 to accommodate longitudinal expansion of the shell 102 and to permit access to the interior of the furnace.

A burner 126 is located at the rear head assembly 120 and is arranged to exhaust its hot products of combustion in a longitudinal direction through the furnace. The burner 126 serves to achieve a prescribed temperature throughout the interior of the furnace and to maintain a substantially nonoxidizing atmosphere therein.

A material inlet feed chute 128 is arranged at the front head assembly 118. This feed chute directs shredded scrap aluminum into the upper end of the shell 102; and as the shell rotates the solid scrap material is slowly worked toward its opposite end. There the fully processed material is discharged as in a conventional kiln. During processing, as in the preceding embodiment, certain organic portions of the scrap material are volatilized and are carried off in gaseous form. The gaseous products produced in the furnace are collected in the first or upper head assembly 118 and are discharged out through a stack 130.

The interior of the shell 102 is lined with refractory brick material as indicated at 132 to protect the steel shell from the high temperature effects produced within the furnace. Additionally there are provided longitudinal ridges 134 of raised refractory brick at various circumferentially displaced locations about the inner surface of the shell 102. These ridges trap the moving scrap material and provide a mixing or agitating effect which serves to expose the material more fully and evenly to the temperatures and atmospheres within the furnace.

Supplemental air is supplied to the interior of the furnace 100 at various locations along its length. This is accomplished by means of a cluster of air conduits 136 which extend axially inwardly from the first head assembly 118. These conduits, as shown, each terminate at a different location along the length of the furnace. Valve means 138 are interposed in each conduit at a location outside the first head assembly 118 so as to achieve precise control of the amount of supplemental air being supplied to each location along the furnace. The conduits 136 are supported in an essentially axial position by means of a suspension cable 140 which is attached at each end respectively to the front and rear head assemblies 118 and 120.

As in the hearth type furnace of FIGS. 2–4, the kiln type furnace of FIG. 5 maintains a controlled interior atmosphere and temperature which serves to volatilize the organic portions of the scrap material being moved along through the furnace. The volatilized gases are then mixed with supplemental air and are burned at a distance from the metallic aluminum values so as to prevent thermite type reactions and at the same time to produce additional heat to aid in the volatilization of additional organic material.

It will be appreciated that with the arrangements of the present invention there is obtained a very high purity recovered product. Further, power requirements are kept low since a great portion of the heat is generated by combination of the organic material associated with the scrap aluminum. At the same time, the manner in which this combustion is controlled serves to prevent undesired melting and/or oxidization of the metallic aluminum values.

Having thus described the invention with particular reference to the preferred forms thereof, it will be obvious to those skilled in the art to which the invention pertains, after understanding the invention that various changes and modifications may be made therein without departing from the spirit and scope of the invention, as defined by the claims appended hereto.

What is claimed as new and desired to be secured by Letters Patent is:

1. A continuous process for recovering aluminum from aluminum scrap comprising the steps of receiving bales of aluminum scrap and passing said material to a shredding machine to separate same into individual fragments, conveying said material through an airtight lock, passing said fragments into a nonoxidizing atmosphere furnace maintained at a temperature below about 1,100° F., to separate out volatile organic material leaving metallic aluminum, carbon and ash, feeding controlled amounts of air to burn the separated volatile organic material in said furnace at a location remote from the remaining material, and passing said remaining material through a mechanical separator for crushing the material and separating out the carbon and ash thereby to provide high grade aluminum material.

2. A continuous process for recovering aluminum from aluminum foil scrap comprising the steps of receiving bales of aluminum foil scrap on a conveyor, dropping said aluminum foil scrap into a shredding machine to separate same into individual fragments, conveying said aluminum foil scrap fragments by an air conveyor to a cyclone, separating the scrap fragments from the air stream, passing said scrap fragments through an airtight lock, passing said fragments into a nonoxidizing atmosphere furnace maintained at a pressure slightly above atmospheric pressure and maintained at a temperature of between about 900° F., and about 1,100° F., to separate out volatile organic material leaving metallic aluminum and solid loosely adhered carbon and ash, feeding controlled amounts of air to burn the separated volatile organic material in said furnace at a location remote from the remaining material, and thence passing said remaining material through a mechanical separator for crushing the material and separating out the carbon and ash thereby to provide high grade aluminum material.

3. A continuous process for recovering aluminum from aluminum foil scrap comprising the steps of receiving bales of aluminum foil scrap on a belt conveyor, dropping said aluminum foil scrap into a shredding machine to separate same into individual fragments, conveying said aluminum foil scrap fragments by an air conveyor to a cyclone, separating scrap fragments from the air stream, passing said scrap fragments through an air-tight lock, passing said fragments into a nonoxidizing atmosphere furnace maintained at a pressure slightly above atmospheric pressure and containing a plurality of hearths, the first hearth being maintained at a temperature from about 900° F. to about 1,110° F., the second and third hearths being maintained at temperatures from about 900° F. to about 1,000° F., and the lower hearth being maintained at a temperature of about 700° F., rabbling the fragments sequentially over said hearths to separate out volatile organic material leaving metallic aluminum and solid loosely adherent carbon and ash, feeding controlled amounts of air above said hearths to burn the separated out volatile organic material in said furnace at locations remote from the remaining material, passing the remaining material, including about 90 percent aluminum and about 10 percent carbon and ash, through a mechanical separator for crushing the material and separating out the carbon and ash thereby to provide high grade aluminum material.

* * * * *